(No Model.)
M. SCHMITT.
HORESHOE NAIL CLENCHER AND HOOF TRIMMER.
No. 603,975. Patented May 10, 1898.
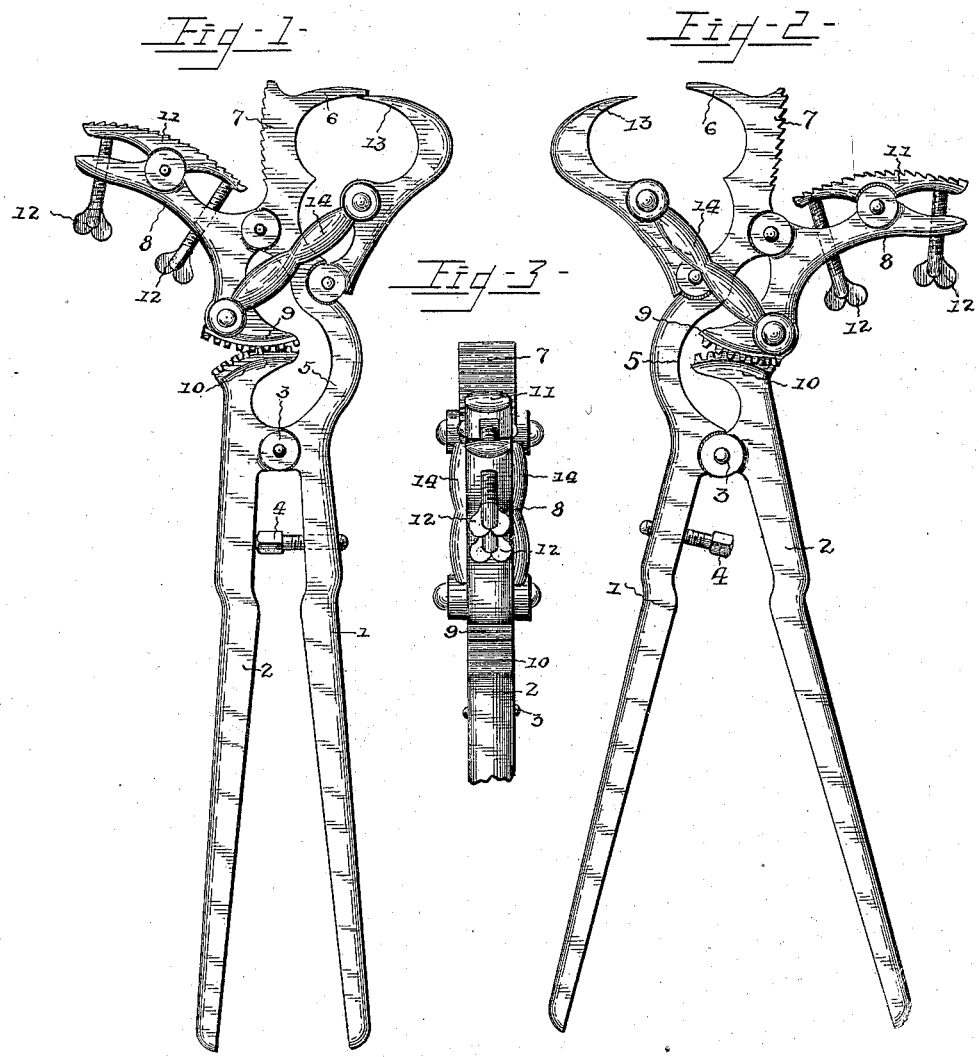
Witnesses
O. J. Young
V. B. Hillyard
Inventor:—
Martin Schmitt,
By his Attorneys,
C. A. Snow & Co.

UNITED STATES PATENT OFFICE.

MARTIN SCHMITT, OF CABORN, INDIANA.

HORSESHOE-NAIL CLENCHER AND HOOF-TRIMMER.

SPECIFICATION forming part of Letters Patent No. 603,975, dated May 10, 1898.

Application filed November 18, 1897. Serial No. 658,966. (No model.)

*To all whom it may concern:*

Be it known that I, MARTIN SCHMITT, a citizen of the United States, residing at Caborn, in the county of Posey and State of Indiana, have invented a new and useful Horseshoe-Nail Clencher and Hoof-Trimmer, of which the following is a specification.

This invention provides a farrier's implement for trimming hoofs and clenching the nails after the latter have been driven home, thereby securing the shoe and preventing the withdrawing of the shoe-securing means.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figures 1 and 2 are obverse and reverse views, respectively, of the implement. Fig. 3 is an edge view.

Corresponding and like parts are referred to in the following description and indicated in the several views of the drawings by the same reference characters.

The implement comprises a relatively stationary handle 1 and a movable handle 2, pivotally connected at 3, the movable handle being limited in its inward throw by a set-screw 4, mounted in a threaded opening of the handle 1. The end of the stationary handle is extended beyond the pivot 3 and is of ogee form, the inner curve 5 coming about opposite the extremity of the movable handle 2 to afford clearance therefor when operating the implement and the outer portion terminating in a jaw 6 and a rest 7, the latter being exterior to the jaw 6 and toothed or roughened to prevent slipping of the implement when in service.

A lever 8 is fulcrumed intermediate of its ends to the front portion of the handle 1 and is curved longitudinally, and its inner or rear end is formed with a toothed segment 9, which intermeshes with a corresponding toothed segment 10 at the front end of the movable handle 2, motion being imparted to the lever 8 upon operating the handle 2 by means of the intermeshing toothed segments 9 and 10. The outer or front end of the lever 8 curves away from the rest 7, and a clenching-bit 11 is pivoted intermediate of its ends thereto and is adjusted with reference to the rest 7 and outer portion of the lever 8 by means of set-screws 12, let into threaded openings of the lever 8 upon opposite sides of the pivotal connection therewith of the clenching-bit. By backing one of the set-screws and advancing the other the clenching-bit can be set so as to adapt itself to the inclination of the outer wall of the hoof, so as to insure a proper clenching of the horseshoe-nails.

A jaw 13 is pivoted at its inner end to the front portion of the handle 1, and its active end is sharpened, forming a cutter which acts in opposition to the jaw 6 when applying the implement for trimming a hoof. Links 14 connect the jaw 13 at an intermediate point with the rear end of the lever 8. Hence upon operating the movable handle 2 the lever 8 and jaw 13 are simultaneously actuated. The links 14 embrace the sides of the parts 8 and 13 and the front portion of the handle 1, thereby equalizing the strain and causing the pivotal connections to wear equally.

For trimming a hoof the jaw 6 is placed against a convenient portion or wall of the hoof, and the active end of the jaw 13 is fitted against the part to be removed, and upon bringing the handles together, which have previously been separated, the jaw 13 will advance and effect the desired end. When clenching a nail, the implement is placed with the shoe against or upon the rest 7 and the clenching-bit 11 against the end of the nail to be clenched, and when the handles are brought together the clenching-bit will be moved toward the rest and effect the clenching, as will be readily understood. The curved portion 5 admits of the toothed segments 9 and 10 having ample play without interfering with the front portion of the stationary handle, as clearly indicated in Fig. 2.

Having thus described the invention, what is claimed as new is—

1. In a farrier's implement, the combination of a stationary handle, a jaw pivoted to the stationary handle, a lever bearing a bit and having pivotal connection between its ends with an extension of the stationary handle, a link connecting the pivoted jaw and lever, and an operating-handle pivoted to the stationary handle and adapted to actuate the aforesaid pivoted lever, substantially in the manner specified.

2. In a farrier's implement, the combination of a stationary handle having a jaw and a rest at its front end, a jaw pivoted to the stationary handle and adapted to act in opposition to the jaw thereof, a lever pivoted between its ends to the front portion of the stationary handle and bearing a bit to act in conjunction with the aforesaid rest, a link connecting the lever with the pivoted jaw, and an operating-handle pivoted to the stationary handle and adapted to actuate the aforesaid lever, substantially as and for the purpose specified.

3. In a farrier's implement, the combination of operating-handles, a clenching-bit pivotally supported between its ends, and set-screws disposed to act upon the clenching-bit upon opposite sides of its pivotal connection for adjusting and holding it in an adjusted position, substantially as set forth.

4. In a farrier's implement, the combination of a handle, a lever pivoted to the handle, a clenching-bit having pivotal connection between its ends with the lever, set-screws applied to the lever upon opposite sides of the pivotal connection therewith of the clenching-bit for properly positioning the latter and holding it in an adjusted position, and means for operating the pivoted lever, substantially as set forth.

5. In a farrier's implement, the combination of a stationary handle provided with a rest at its front end, a lever fulcrumed to the front portion of the stationary handle and having its rear end formed with a toothed segment, a clenching-bit having adjustable connection with the front end of the pivoted lever, and an operating-handle pivoted to the stationary handle and having a toothed segment at its front end intermeshing with the toothed segment of the pivoted lever, substantially as described.

6. In a farrier's implement, the combination of a stationary handle having a rest at its front end and a curved portion in the rear of the said rest, a lever pivoted between its ends to the front portion of the stationary handle and having a toothed segment at its rear end and its front end outwardly curved, a clenching-bit pivoted to the curved end of the lever and capable of adjustment, and an operating-handle pivoted to the stationary handle and having a toothed segment intermeshing with the toothed segment of the pivoted lever, both of the toothed segments adapted to enter the space formed by curving the front portion of the stationary handle, substantially as described.

7. The herein-described farrier's implement, comprising a stationary handle having a jaw and a rest at its front end and its forward portion curved, a jaw pivoted to the front portion of the stationary handle, a lever pivoted between its ends to the front portion of the said handle and having its forward portion outwardly curved and a toothed segment at its rear end, a clenching-bit pivoted between its ends to the outer end of the pivoted lever, set-screws for adjusting and holding the clenching-bit in an adjusted position, links connecting the pivoted jaw with the rear end of the pivoted lever, and an operating-handle pivoted to the stationary handle and having a toothed segment at its front end intermeshing with the toothed segment of the pivoted lever, substantially as described.

In testimony that I claim the foregoing as my own I have hereto affixed my signature in the presence of two witnesses.

MARTIN SCHMITT.

Witnesses:
 JOHN HERRMANN,
 PHILIP REISING.